Aug. 7, 1956     L. D. HAGENBOOK     2,757,809
SHOCK RESISTANT MOUNTING FOR VEHICLES
Filed March 8, 1952     3 Sheets-Sheet 1
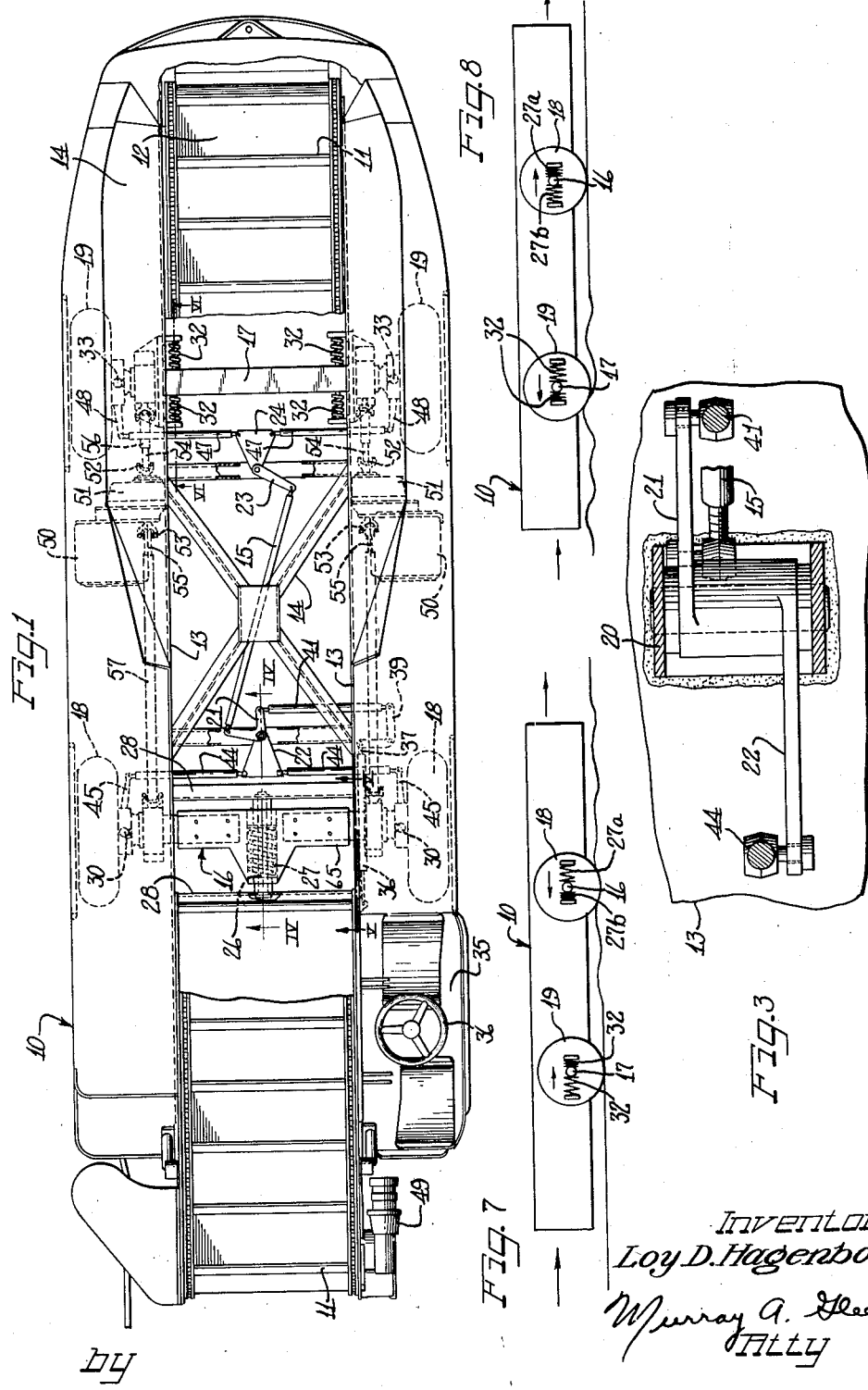
Inventor:
Loy D. Hagenbook
by Murray A. Gleeson
Atty

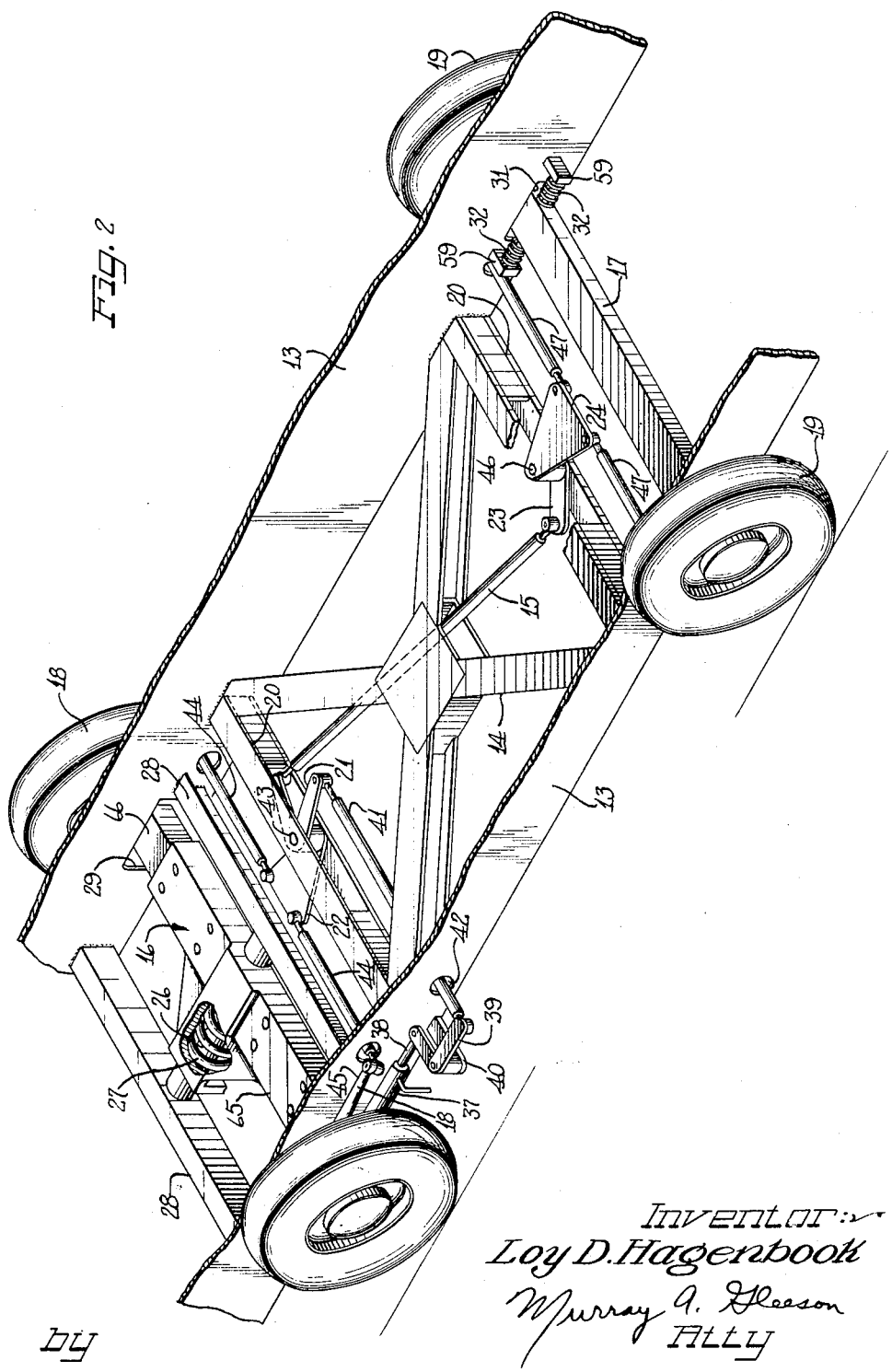

Aug. 7, 1956　　　　L. D. HAGENBOOK　　　　2,757,809
SHOCK RESISTANT MOUNTING FOR VEHICLES
Filed March 8, 1952　　　　　　　　　　　　　3 Sheets-Sheet 3

Inventor:
Loy D. Hagenbook
Murray J. Gleeson
By　　　　　Atty

United States Patent Office 2,757,809
Patented Aug. 7, 1956

2,757,809

SHOCK RESISTANT MOUNTING FOR VEHICLES

Loy D. Hagenbook, Chicago, Ill., assignor to Goodman Manufacturing Company, Chicago, Ill., a corporation of Illinois Application March 8, 1952, Serial No. 275,568

11 Claims. (Cl. 214—83.36)

This invention relates to improvements in shock resistant mountings for vehicles and more particularly relates to an improved mounting for such vehicles as operate in confined spaces, such as mines underground.

Rubber tire mounted vehicles commonly known as shuttle cars are frequently used to transport coal from the working face of a mine to a common unloading station. Such vehicles travel at relatively slow speeds and have usually been driven by individual motors on each side of the vehicle, each motor driving a set of front and rear wheels through a differential. Such vehicles also have a conveyor movable along the bottom of the car and the height of the car is limited by the depth of the working seam. In order to maintain a high capacity car with a minimum overall height, the conveyor forming the bottom of the vehicle is arranged closely adjacent the ground, resulting in a low vehicle of a low ground clearance.

Due to this low ground clearance and low overall height of the vehicle, it has never been possible to suspend the frame of the vehicle on springs. The rear axle and wheels usually have the frame directly mounted thereon, while the front axle and wheels are usually mounted on the frame for limited vertical movement about an axis extending along the longitudinal center of the frame.

In carrying out my invention, I provide a suspension for the vehicle frame on its axles, accommodating the axles for free back and forward movement with respect to the frame, to compensate for a lack of vertical springing of the vehicle, and to cushion the starting shocks of motor torque on the axles from the vehicle frame.

I further make it possible to eliminate the differentials heretofore provided in the drive to each set of front and rear wheels by accommodating the front and rear axles to move back and forth with respect to each other during travel of the vehicle along the ground, so that when alternate rough and smooth ground is encountered, one axle will move backward due to the reaction of its wheels against the rough ground and the other axle will move toward the one axle, and when the wheels on the one axle pass onto the smooth ground and the wheels on the other axle pass onto rough ground, the two axles will move away from each other due to the reaction of wheels of the other axle on the rough ground. This variation in spacing of the axles will thus automatically compensate for the slightly differing rotational speeds of the front and rear wheels.

A principal object of my invention is to provide a shock resistant mounting for vehicles arranged with a view toward reducing the shocks to a vehicle body as it travels over rough ground without increasing the height of the vehicle.

Another object of my invention is to provide a novel and improved form of shock resistant mounting for vehicles by mounting a vehicle axle to move longitudinally of the vehicle frame when its wheels encounter rough ground, and by yieldably centering the vehicle axle with respect to the frame.

Still another object of my invention is to provide a spring mounting for a shuttle car of a low overall height and ground clearance by spring mounting the axles for limited forward and backward movement with respect to the car frame so as to cushion the shock of motor torque and accommodate the wheels riding over a bump to take more time to raise the car body over the bump.

Still another object of my invention is to provide a shock resistant mounting for vehicles of the shuttle car type arranged to absorb shocks from the axles to the frame by mounting the axles for floating movement longitudinally of the frame and yieldably restraining floating movement thereof.

Still another object of my invention is to provide a novel and improved form of shock resistant mounting for vehicles of the shuttle car type arranged to render the use of differentials heretofore used in the drive to the front and rear wheels to such vehicles unnecessary, by accommodating each axle to translationally move back and forth with respect to the car body to the ground to automatically maintain the speeds of the front and rear wheels substantially the same by relative movement of said axles with respect to each other.

Another and more detailed object of my invention is to provide a shock resistant mounting for shuttle cars of the type having a conveyor extending along the bottom thereof between the sidewalls thereof, with front and rear axles extending through the runs of the conveyor, so arranged as to reduce the shocks imparted to the vehicle frame without interfering with the conveyor or increasing the height of the machine by guiding the axles for movement longitudinally of the frame and by maintaining the axles in centered relation with respect to their guide means by opposing spring means.

These and other objects of my invention will appear from time to time as the following specification proceeds and with reference to the accompanying drawing wherein:

Figure 1 is a plan view of a shuttle car illustrating one form in which my invention may be embodied;

Figure 2 is a fragmentary isometric view of the shuttle car shown in Figure 1 illustrating the longitudinal floating mountings for the axles and the steering linkage for the wheels of the vehicle;

Figure 3 is a sectional view taken through the front steering bell crank shown in Figure 1;

Figures 7 and 8 are diagrammatic views showing the vehicle travelling over alternate smooth and rough ground and schematically illustrating certain principles of my invention.

Figure 4:
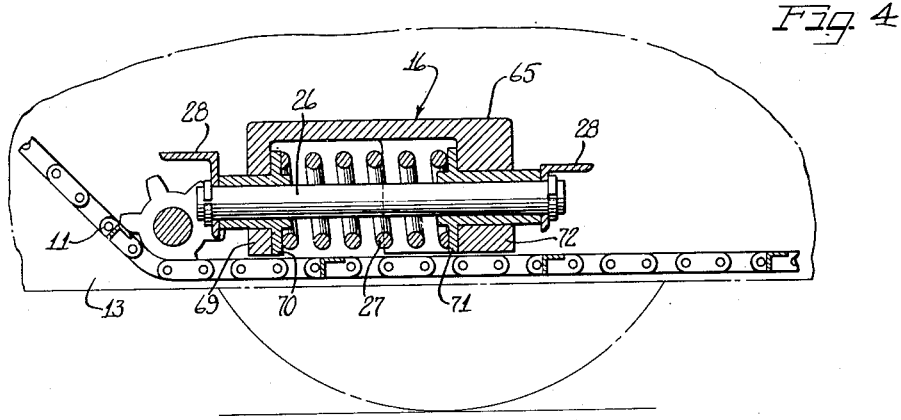
Figure 4 is another sectional view taken substantially along line IV—IV of Figure 1 but omitting the bell crank shown in Figure 3.
Figure 6:
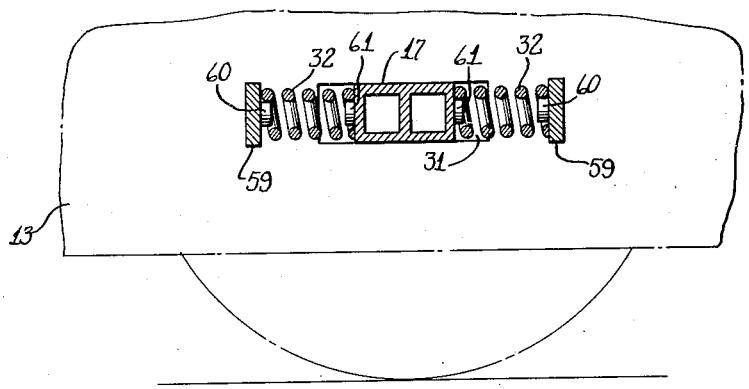
Figure 6 is a sectional view taken substantially along the line VI—VI of Figure 1 illustrating certain details of the resilient floating mounting for the rear axle of the vehicle.

In the embodiment of my invention illustrated in the drawings, I have shown generally a shuttle car of a type adapted to be loaded at the working face of a mine usually by a loading machine, or a combined mining and loading machine. The shuttle car is shown as including a frame 10 having a conveyor 11 extending along a bottom plate 12 of said frame between side walls 13, 13 thereof. The shuttle car is usually loaded by a loading boom of a loading machine or a combined mining and loading machine (not shown) and the coal loaded thereon by the loading boom is progressed toward the discharge end of the car by the step-by-step operation of the conveyor 11, which also serves to unload the car.

The side walls 13, 13 extend generally vertically for the entire length of the car above and below the bottom plate 12 and are outwardly flared adjacent the receiving end of the conveyor to provide a widened hopper to accommodate a loading boom (not shown) of a loading device to laterally move with respect thereto during the loading operation, and to increase the capacity of the car at its receiving end, as is usual with vehicles of this type.

As shown in Figures 1 and 2 of the drawings, the side walls 13, 13 are braced intermediate their ends by an X-frame 14 disposed beneath the bottom of the plate 12 between front and rear axles 16 and 17, respectively, for the vehicle. The X-frame 14 is shown as being open at its center to accommodate a steering link 15, connecting front and rear steering wheels 18, 18 and 19, 19 on the outer ends of the axles 16 and 17, respectively, to turn together for steering the vehicle. Hollow cross beams 20, 20 which may be of a box-like cross-section, extend across the side walls 13, 13 adjacent each end of the X-frame 14. Said cross beams are shown as being open adjacent the central portion thereof, to accommodate a front steering bell crank 21 and arm 22 extending therefrom, and a rear steering lever 23 and arm 24 extending therefrom.

The front axle 16 is pivoted for movement about the axis of a longitudinally extending shaft 26 and supports the frame 10 on said shaft. Said front axle is also movable along said shaft backwardly and forwardly with respect to the frame 10 against a centering compression spring 27, as will hereinafter more clearly appear as this specification proceeds. The shaft 26 is shown as being secured at its ends to longitudinally spaced transverse beams or angle irons 28, 28 connected at their ends to the side walls 13, 13.

Figure 5:
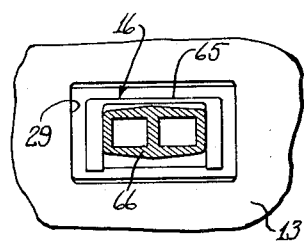
Figure 5 is a sectional view taken substantially along line V—V of Figure 1 and illustrating the relation of the front axle to one of the side walls of the vehicle.

The front axle 16 extends through elongated openings or slots 29, 29 formed in the side walls 13, 13 to accommodate the front axle for limited vertical and longitudinal movement with respect to the frame 10 (see Figure 5).

The wheels 18, 18 are suitably mounted on opposite ends of the front axle 16 for steering movement about upright spindles generally indicated by reference characters 30, 30. The mountings of said wheels on said steering spindles and the journaling of said wheels on their horizontally extending spindles (not shown) may be of any well known form and are not herein shown or described in detail since they form no part of my present invention.

The rear axle 17 is shown as being of a hollow box-like construction with a central reinforcing wall and extends through longitudinally extending slots 31, 31 in the side walls 13, 13 of the main frame 10. In Figure 2, the main frame is shown as resting directly on said axle on the upper walls of the slots 31, 31. It should be understood, however, that if desired, a bearing or snubbing plate may be interposed between said main frame and axle, and that any other snubbing or shock absorbing means may be interposed therebetween, to afford the required resistance to slidable movement of the axle with respect to the frame, and to serve as a shock absorbing medium.

The rear axle 17 is movable along the guide slots 31, 31 against opposed centering compression springs 32, 32 yieldably maintaining said axle in centered relation with respect to said slots, as will hereinafter more clearly appear as this specification proceeds.

The rear wheels 19, 19 are suitably mounted on the outer ends of the axle 17 for turning movement with respect thereto about horizontal axes and for steering movement about vertical spindles indicated generally by reference characters 33, 33. Said spindles and the mounting of the wheels thereon and also the journaling of the wheels for rotation upon horizontal axes are not herein shown or described since they may be of any well known form and are no part of my present invention.

The frame 10 is shown as having an operator's compartment 35 at the forward end thereof to one side of the conveyor 11 and on the outside of the side wall 13 which in Figure 1 is the left hand side wall. A steering wheel 36 is shown as being mounted in said operator's compartment. The steering wheel 36 may be suitably connected with a booster cylinder 37 for steering the vehicle. The booster cylinder 37 may be of a well known form of steering booster cylinder in common use for steering motor vehicles and the connection from the steering wheel 36 to said booster cylinder may also be of a well known form commonly used in shuttle cars and no part of my present invention so not herein shown or described in detail.

The booster cylinder 37 is shown as having a piston rod 38 extending therefrom, having pivotal connection at its free end with one arm of a bell crank 39, pivoted intermediate its ends to the left hand side wall 13 on the outside thereof, on a bracket 40. The other arm of the bell crank 39 has pivotal connection with a transversely movable rod 41 extending through an opening 42 in the side wall 13. The rod 41 is shown as being connected at its opposite end with one arm of the bell crank 21, for pivotally moving said bell crank and the rear steering arm 23 through the link 15 extending through the center of the X-frame 14. The bell crank 21 is shown as being mounted between the top and bottom sides of the cross beam 20 on a pivot pin 43. The forwardly extending lever 22 is shown as being of a generally triangular form in plan with its apex extending from the hub of the bell crank 21. Two links 44, 44 are pivotally connected with the arm 22 adjacent opposite ends of the base of the triangle and are pivotally connected at their outer ends with steering arms 45, 45, suitably connected with the front wheels for pivoting said wheels about the axes of the front spindles 30, 30.

In a like manner, the lever arm 23 is shown as being connected between the top and bottom sides of the rear cross beam 20 on a pivot pin 46. The rearwardly extending lever arm 24 is shown as being of a generally triangular form with its apex extending from the hub of the lever 23 and having steering links 47, 47 pivotally connected thereto adjacent opposite ends of the base of said arm. The links 47, 47 have pivotal connection with steering arms 48, 48, suitably connected with the rear wheels 19, 19 for pivoting said rear wheels about the axes of the spindles 33, 33 simultaneously with steering movement of the front wheels to steer the vehicle.

The conveyor 11 is shown as being a well known form of chain and flight-type conveyor movable along the bottom plate 12 from one end of the car to the other between the side walls 13, 13 and may be driven from a fluid motor and reducer 49 at the discharge end of the conveyor. The return run of the conveyor is shown in Figure 4 as being slidably guided to travel beneath the axle 16. The return run of said conveyor is also guided beneath the steering linkage just described and the axle 17 to the receiving end of the car. The forward and rear axles 16 and 17 are thus contained between the load-carrying and return runs of the conveyor 11, as is the steering linkage effecting steering movement of the front and rear wheels 18, 18 and 19, 19, respectively.

Individual motors 50, 50 are suitably mounted on the outsides of the side walls 13, 13 for driving the front wheels 18, 18 and the rear wheels 19, 19. Each motor 50 is shown as having a speed reducer 51 secured thereto. The speed reducer 51 may be of any well known form so arranged as to provide the required reduction in speed from the motor shaft to drive the car at the slow speed necessary for underground operation. As herein shown, each speed reducer 51 has universal coupling members 52, 53 extending in opposite directions therefrom and having shafts 54, and 55, respectively, driven therefrom. The shafts 54 and 55 may be splined and are shown as having slidable driving engagement with the sleeves 56 and 57, respectively, which may be internally splined. The sleeve 56 is shown as having driving connection with a rear wheel 19 through a suitable system of reduction gearing (not shown) and no part of my present invention so not herein described further.

The sleeve 57 driven from the shaft 55 likewise has driving connection with the front wheel 18 through suitable reduction gearing which is not herein shown or described since it forms no part of my present invention.

It should be noted, however, that the front and rear wheels on each side of the vehicle are driven by individual motors 50, 50 and that the drive connections from said motors to said wheels may be direct gear reduction drive connections and that the longitudinal drive shafts therefor are extensible to accommodate the front and rear axles 16 and 17 to move backwardly and forwardly with respect to the motors 50, 50 and the side walls 13, 13.

Referring now in particular to the floating mountings for the front and rear axles 16 and 17 on the frame 10, the rear axle 17 is shown as extending through the longitudinally extending rectilinear guide slots 31, 31 in the side walls 13, 13, and as being abutted at its opposite ends just inwardly of said slots by the opposed compression springs 32, 32. The springs 32, 32 are shown as being mounted on the inside of the side walls 13, 13 and as abutting lugs 59, 59 extending inwardly from said side walls and spaced from opposite ends of the rectilinear guide slots 31, 31. The springs 32, 32 are shown as encircling retainer pins 60, 60 extending inwardly from the lugs 59, 59 toward the axle 17. The adjacent ends of the springs 32, 32 are shown as encircling retainer pins 61, 61 extending from opposite sides of the axle 17 toward the lugs 59, 59. The centering springs 32, 32 engaging opposite sides of the axle 17 inwardly of the side frame members 13, 13 thus serve to center the axle 17 with respect to the rectilinear guide slots 31, 31 and to accommodate said axle for resilient floating movement along said guide slots in either a forward or backward direction.

The front axle 16 movable along and tiltable about the longitudinally extending shaft 26 is herein shown as including a transverse axle beam 65 generally U-shaped in cross-section and opening toward the ground and having hollow axle beams 66 mounted therein and extending therefrom through the slotted portions 29, 29 of the side walls 13, 13 and having the vertical steering spindles 30, 30 mounted on the ends thereof. The axle beams 66, 66 may be secured to the axle beam 65 as by riveting or in any other suitable manner.

The transverse axle beam 65 has a central forwardly extending bracket portion opening toward the ground and having a depending front wall 69 within which is slidably mounted a flanged bushing or sleeve 70. The flange of said sleeve is shown as being on the inside of the front wall 69. A second flanged bushing or sleeve 71 is mounted in the rear wall 72 of the axle beam 65, with the flange thereof on the inside of said rear wall and facing the flange of the flanged sleeve 70. The flanged sleeves 70 and 71 are mounted on the longitudinal shaft 26 and form a mounting for the transverse axle beam 65 and the front axle 16 on said shaft for pivotal movement with respect thereto and for slidable movement therealong.

The centering compression spring 27 is shown as encircling the longitudinal shaft 26 and as being seated at its opposite ends in the flanges of the respective sleeves 70 and 71, to yieldably maintain the front axle 16 in centered relation with respect to the longitudinal shaft 26 and the slots 29, 29 in the side walls 13, 13, but to accommodate said axle to yieldably and floatingly move longitudinally along the shaft 26 with respect to the side walls 13, 13 and the slotted portions 29, 29 thereof in a forward or backward direction.

It should here be noted that as the axles 16 and 17 move relatively with respect to the frame 10 and the side walls 13, 13 thereof, that said axles will also move relatively to the steering linkage mechanism therefor. This will cause the wheels to turn in one direction or another an amount determined by the displacement thereof with respect to the frame. While this turning movement back and forth may be objectionable in a relatively high speed fast moving vehicle, it is neither objectionable not detrimental and has no effect on the operation of a vehicle of the class herein shown and described, since the speed of the vehicle is usually only a few miles an hour.

In Figures 7 and 8, I have diagrammatically shown the positions of the axles 16 and 17 with respect to the vehicle frame while traversing alternate smooth and rough bottom and in Figure 7, I show the front wheels 18 of the vehicle riding over a bump with the rear wheels on smooth bottom. As the wheels 18 strike a bump, the entire axle assembly will move against its centering spring means, illustratively shown in this figure as being two opposing springs 27$^a$ and 27$^b$. As the wheels 18 engage a bump on the ground or mine floor, the spring 27$^b$ will be compressed and the wheels will slow up due to deflection of the centering springs, giving the wheels more time to raise the tire and car body over the bump.

This arrangement also makes it possible to eliminate the differential heretofore provided in the drive to each set of front and rear wheels. Such differentials have heretofore been necessary because when traveling over rough and smooth stretches of ground, the wheels on the rough ground must increase their rotational speed to compensate for the added surface that must be traversed. With the shuttle car as constructed at present, the distance between the front and rear axles is always fixed and one set of wheels must rotate at a higher speed than the other the instant the footing differs or the ground becomes rough, to prevent sliding of the tires on the ground. In order to accommodate this, a differential has heretofore been provided between each pair of front and rear wheels.

In the present invention, the differential has been eliminated by permitting each axle to move back and forth with respect to the body independently of each other. As for example, in Figure 7, the shuttle car is shown as traveling toward the right. When traveling along smooth ground or floor, the front and rear axles are floated toward a central position between springs 27$^a$, 27$^b$ and 32, 32. As the front wheels pass over a rough spot on the ground, the front axle will be shifted backwardly compressing the rear springs 27$^b$. Since the wheels journalled on the rear axle are on smooth ground, the rear axle will be translated forwardly at a relatively greater speed compressing the front springs 32. The two axles will thus move closer together, as shown in Figure 7.

When the front wheels pass onto smooth ground and the rear wheels encounter rough ground, as shown in Figure 8, the rear axle will move backwardly away from the front axle against the rear springs 32 tending to move the frame 10 rearwardly, while the front axle will move forwardly against the springs 27$^a$ with the result that the two axles will move apart. Thus, as the front and rear wheels alternately pass over relatively rough and smooth ground, the spacing of the axles automatically varies to compensate for the tendency of the front and rear wheels to travel at slightly differing rotational speeds, rendering the use of differentials on each side of the shuttle car unnecessary to compensate for the differing speeds.

It may further be seen that as the car starts, the axles initially push against the body through the front springs if the vehicle starts in a forward direction. This prevents the direct application of shock loads from the axle to the body and also reduces the stresses on the driving mechanism and softens the starting action of the car.

It will be understood that modifications and variations may be effected without departing from the scope of the novel concepts of the present invention.

I claim as my invention:

1. In a shock resistant mounting for a vehicle having a frame, two spaced axles having wheels journaled thereon and forming a support for said frame, means mounting one of said axles on said frame for longitudinal floating movement with respect thereto, a longitudinal pivot shaft mounting the other of said axles on said frame for longitudinal movement along said shaft and for vertical movement with respect thereto about the axis of said shaft, and spring means interposed between said frame and opposite sides of both of said axles and yieldably restraining movement thereof longitudinally of said frame in either direction.

2. In a shock resistant mounting for a vehicle having a frame, two spaced axles having wheels journaled thereon forming a support for said frame, means for mounting one of said axles for floating movement longitudinally of said frame comprising two laterally spaced aligned longitudinal guides extending along said frame and having said axle slidably mounted therein, spring means centering said axle with respect to said guides, a shaft extending along the longitudinal center of said frame, the other of said axles being mounted on said shaft for pivotal movement with respect thereto and for slidable movement therealong, and spring means yieldably centering said axle on said shaft.

3. In a shock resistant mounting for a vehicle having a frame, two spaced axles having wheels journaled thereon, means for mounting one of said axles for floating movement longitudinally of said frame comprising two laterally spaced longitudinal guides extending along said frame and having said one axle slidably mounted thereon, and opposed spring means at opposite ends of said guides having engagement with opposite sides of said axle and yieldably centering said axle with respect to said guides.

4. In a shock resistant mounting for a vehicle having a frame, two spaced axles having wheels journaled thereon for supporting said frame, means for mounting one of said axles for floating movement longitudinally of said frame comprising two laterally spaced aligned longitudinal guides having said axle slidably mounted therein and supporting said frame on said axle, opposed springs at opposite sides of said frame having engagement with said axle for yieldably centering said axle along said guides, a shaft extending along the longitudinal center of said frame, an axle mounted on said shaft for pivotal movement thereabout and for slidable movement therealong, and spring means yieldably centering said axle on said shaft.

5. In a shuttle car, a frame having laterally spaced side walls and a bottom plate extending therebetween, a conveyor extending along said bottom plate, a pair of spaced axles extending between the runs of said conveyor and having wheels journaled on the ends thereof, and means for mounting said frame on said axles and reducing the shocks imparted thereto when starting and traversing rough ground comprising a shaft extending along said frame in centered relation with respect to said side walls and having one of said axles mounted thereon for slidable movement therealong and for pivotal movement thereabout, means restraining pivotal movement of said axle to the space between the runs of said conveyor, two laterally spaced rectilinear guides in said frame and having the other said axles mounted therein for slidable movement therealong and forming a support for said frame on said other axle, and opposing spring means operatively engaging each of said axles and yieldably maintaining said axles in longitudinally centered relation with respect to said shaft and guide means.

6. In a shuttle car, a frame having laterally spaced side walls with a conveyor disposed therebetween and extending along the bottom of said frame, spaced axles extending between the runs of said conveyor rectilinear guide means supporting said frame on said axles and guiding said axles on said frame for movement longitudinally thereof, wheels journaled on the ends of said axles, a motor mounted on the outside of each side wall, extensible drive connections from each motor to a front and rear wheel, and means for yieldably maintaining said axles in longitudinally centered relation with respect to said guide means and accommodating said axles to vary the spacing thereof when traveling over rough ground and automatically equalizing the speeds of said front and rear wheels by relative movement of said axles with respect to each other.

7. In a shuttle car, a frame having laterally spaced side walls, a pair of spaced axles, wheels mounted on said axles, a motor on the outside of each side wall, extensible drive connections from each motor to a front and a rear wheel, means mounting said frame on said axles and accommodating said axles to move longitudinally thereof and to vary the spacing between said axles when said wheels are traveling rough ground and automatically equalizing the speeds of said wheels by relative movement of said axles with respect to each other comprising support and guide means on said frame, supporting said frame on said axles and guiding said axles for independent longitudinal movement with respect to said frame, and spring means on said frame having operative engagement with said axles for yieldably centering said axles with respect to said support and guide means.

8. In a shuttle car, a frame having laterally spaced side walls, two support axles therefor having driving wheels journaled on the ends thereof, a motor mounted on the outside of each of said side walls, extensible drive connections from each motor to a pair of front and rear drive wheels, longitudinal guides on said frame forming a support for said frame on said axles and guiding said axles for longitudinal movement with respect to said frame, and opposing spring means yieldably restraining movement of said axles with respect to said frame in either direction and accommodating said axles to move relatively to said frame when traversing alternate rough and smooth ground and automatically equalizing the speeds of said wheels by relative movement of said axles with respect to each other.

9. A shock resistant mounting for low vehicles of a low overall road clearance operable in confined spaces comprising a frame, two spaced axles having wheels thereon forming a support for said frame, support and guide means for said axles on said frame mounting said frame on said axles and guiding said axles for limited longitudinal movement with respect to said frame, and oppositely acting compression springs having operative engagement with said axles and yieldably restraining movement of said axles with respect to said frame in either direction.

10. A shock resistant mounting for vehicles of a low overall road clearance operable in confined spaces, comprising a frame having laterally spaced side walls, a pair of spaced axles having wheels thereon for supporting said frame for movement along the ground, longitudinally extending support and guide means in said side walls, for supporting said frame on one of said axles and accommodating said axle to move longitudinally with respect to said frame, and other support and guide means for the other of said axles supporting said frame on said axle and accommodating said axle for longitudinal movement with respect to said frame and for pivotal movement about an axis extending along the center thereof, and centering springs yieldably centering said axles with respect to said support and guide means and yieldable accommodating movement of said axles along said support and guide means in either direction.

11. A shock resistant mounting for vehicles of a low overall road clearance operable in confined spaces comprising a frame having laterally spaced side walls, two longitudinally spaced axles having wheels thereon and supporting said frame for movement along the ground, means mounting said frame on said axles and accommodating said axles to move longitudinally thereof and vary the spacing therebetween when said wheels are traveling over rough ground and automatically equalizing the speeds of said wheels by relative movement of said axles with respect to each other comprising aligned longitudinally extending support and guide slots in said side walls for supporting said frame on one of said axles and accommodating said axle to move longitudinally along said slots with respect to said frame, a shaft mounted on said frame and extending along the center thereof and having said other axle mounted thereon for movement therealong and pivotal movement thereabout, and centering springs engageable with said axles and yieldably centering said axles with respect to said slots and shaft.

References Cited in the file of this patent

UNITED STATES PATENTS

| | | |
|---|---|---|
| 655,686 | Cawley | Aug. 14, 1900 |
| 905,462 | Rosenberger | Dec. 1, 1908 |
| 1,711,601 | Jereczek | May 7, 1929 |
| 2,005,103 | Moorhouse | June 18, 1935 |
| 2,087,396 | Bennett et al. | July 20, 1937 |
| 2,192,650 | Russell | Mar. 5, 1940 |
| 2,378,892 | Arentzen | June 26, 1945 |
| 2,387,093 | Schmied | Oct. 16, 1945 |
| 2,405,636 | Beck | Aug. 13, 1946 |
| 2,493,025 | Pointer | Jan. 3, 1950 |
| 2,668,408 | Klenk | Feb. 9, 1954 |